(12) United States Patent
Akashi

(10) Patent No.: US 6,178,212 B1
(45) Date of Patent: Jan. 23, 2001

(54) RETIMING CIRCUIT AND METHOD FOR PERFORMING RETIMING

(75) Inventor: Tamotsu Akashi, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/039,593

(22) Filed: Mar. 16, 1998

(30) Foreign Application Priority Data

Oct. 17, 1997 (JP) .................................................. 9-285359

(51) Int. Cl.[7] .................................................. H04L 7/00
(52) U.S. Cl. ........................ 375/355; 375/371; 375/375
(58) Field of Search .................... 375/375, 238, 375/354, 355, 371, 373; 332/109; 369/59

(56) References Cited

U.S. PATENT DOCUMENTS

| | | | |
|---|---|---|---|
| 4,734,900 | * | 3/1988 | Davie ...................................... 369/59 |
| 5,132,957 | * | 7/1992 | Mashimo ................................ 369/59 |
| 5,438,303 | * | 8/1995 | Murakami et al. ................... 332/109 |
| 5,640,131 | * | 6/1997 | Kawasaki et al. .................... 332/109 |
| 6,028,898 | * | 2/2000 | Sparks et al. ......................... 375/317 |

FOREIGN PATENT DOCUMENTS

| | | |
|---|---|---|
| 7193562 | 7/1995 | (JP) . |
| 2274947 | 11/1997 | (JP) . |

* cited by examiner

*Primary Examiner*—Don N. Vo
(74) *Attorney, Agent, or Firm*—Helfgott & Karas, P C.

(57) ABSTRACT

A retiming circuit able to constantly perform sampling by a clock at a center portion of input data and performing a correct discrimination of logic "1" and "0" even if there is duty fluctuation of a pulse, provided with delay unit for imparting a variable delay to input data or a clock; a reference clock generating unit for generating a reference clock synchronized with the clock; a first phase difference detection unit for detecting a phase difference between a rising edge of the reference clock and the rising edge of the input data; a second phase difference detection unit for detecting a phase difference between the rising edge of the reference clock and a falling edge of the input data; and an intermediate phase setting unit for calculating the intermediate phase of the input data based on the outputs of the first and second phase difference detection units, the delay being controlled based on the intermediate phase.

16 Claims, 14 Drawing Sheets

RETIMING CIRCUIT AND METHOD FOR PERFORMING RETIMING

BACKGROUND OF THE INVENTION

1. Field of the Invention

The present invention relates to a retiming circuit, for example, a retiming circuit provided in an optical receiving unit in an optical data transmission system.

For example, when a logic "1" or "0" of an optical data signal transmitted from an optical transmitting unit at one end of the optical data transmission system is discriminated at the optical receiving unit placed at the other end thereof, desirably the discrimination is carried out at the center portion of each pulse corresponding to the logic "1" and "0". This is because, generally, there is a lot of noise in the vicinity of the rising edge of each pulse and in the vicinity of the falling edge of each pulse, and therefore it is most correct to judge the logic "1" or "0" at the center portion where there is the least noise. For this reason, the phase between the input data and clock is adjusted so that each optical data signal received at the optical receiving unit, that is, the center portion of each input data, and the timing for the discrimination substantially coincide. This is done by the retiming circuit.

2. Description of the Related Art

As will be explained in more detail later by using the drawings, if the retiming circuit of the related art is adopted, the following two problems arise.

First, there is the problem that, according to the retiming circuit of the related art, the optimum phase clock (CLK) is selected by just the rising changing point of the input data (Din), therefore when there is a fluctuation in the duty, explained later, it is no longer possible to sample the center portion of a pulse. This is because the true center portion of the pulse must be determined by taking not only the rising changing point of the input data (Din), but also its falling changing point into account.

Second, there is the problem that, according to the retiming circuit of the related art, it is difficult to sample the center portion of each pulse with an extremely high precision for all of various input data (Din) from a large number of subscriber side equipment. This is because, in the retiming circuit of the related art, it is necessary to select one optimum phase clock from among limited number of types of clocks.

SUMMARY OF THE INVENTION

Accordingly, in consideration with the above problems, an object of the present invention is to provide a retiming circuit and a method for performing retiming able to always discriminate the logic at the center portion of each pulse even if the duty of the pulses fluctuates and, at the same time, able to make the center portion of a pulse coincide with the clock without error to operate at a high speed.

To attain the above object, according to the present invention, there is provided a retiming circuit provided with a delay means for imparting a variable delay to input data or a clock; a reference clock generating means for generating a reference clock synchronized with the clock; first phase difference detection means for detecting the phase difference between a rising edge of the reference clock and a rising edge of the input data; a second phase difference detection means for detecting the phase difference between a rising edge of the reference clock and a falling edge of the input data; and an intermediate phase setting means for calculating the intermediate phase of the input data based on the outputs of the first and second phase difference detection means, the amount of the delay being controlled based on the intermediate phase. By this, even if there is a fluctuation in the duty of the pulse, sampling by the clock is always carried out at the center portion of the input data and the logic "1" and "0" is correctly discriminated.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 16:
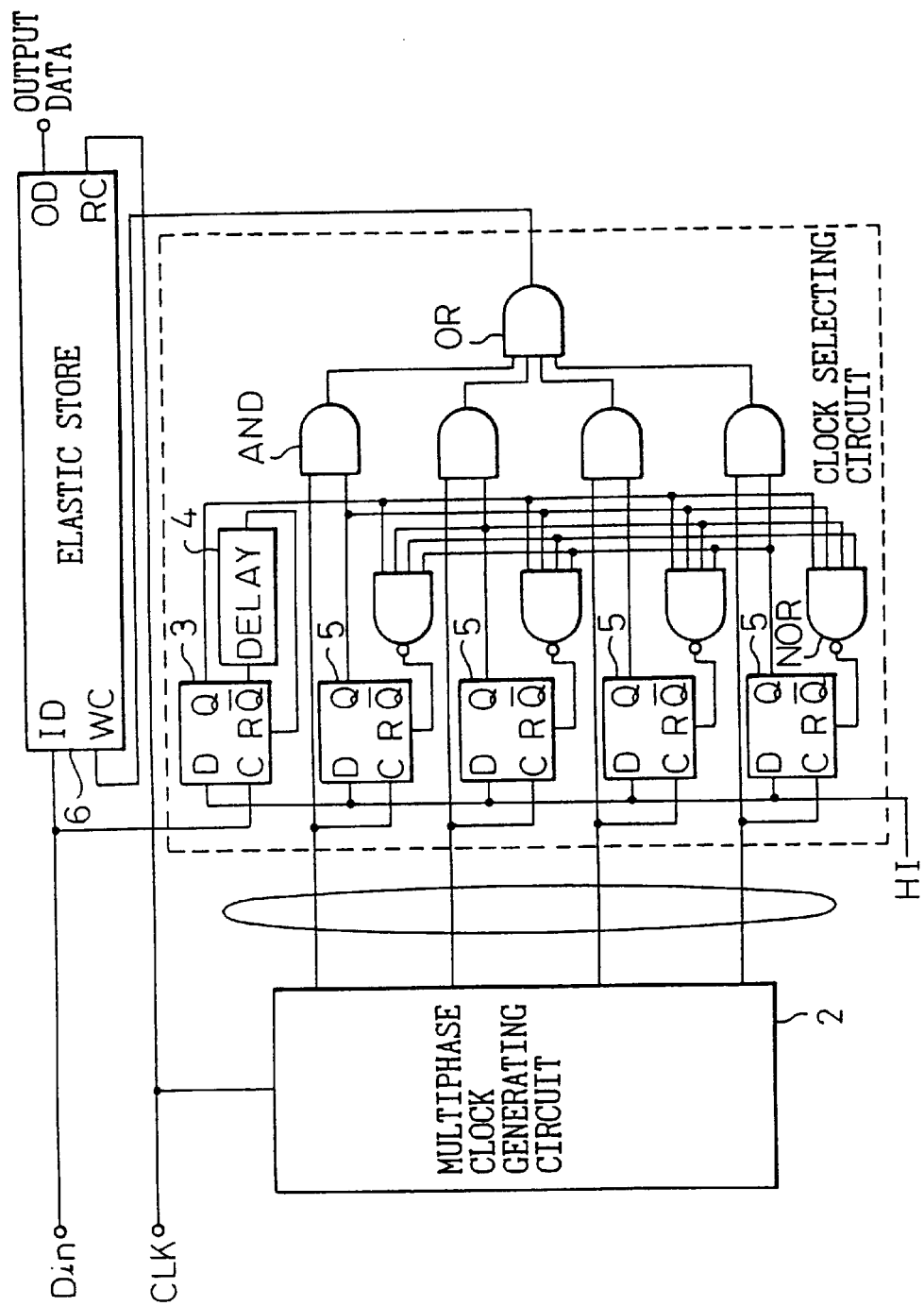
FIG. 16 is a view of an example of a retiming circuit of the related art.

FIG. 16 is a view of an example of a retiming circuit of the related art. The retiming circuit 1 shown in the figure is the circuit disclosed in FIG. 9 of Japanese Unexamined Patent Publication (Kokai) No. 7-193562 (bit synchronization circuit).

This retiming circuit 1 adopts a multiphase sampling method for making a high speed response possible. The clock CLK is made multiphase by a multiphase clock generating circuit 2 to detect the changing point of the input data Din and the optimum clock is selected by the detected phase. First, a D-flip-flop 3 operates by the rising changing point of the input data Din. After a time determined by a delay element 4, four D-flip-flops 5 are placed in a state waiting for input. Then, one of the multiphase clocks, input first after the state waiting for input is entered, is selected. The selected clock is used to write the input data Din into an elastic store memory 6 for discrimination.

Figure 17:
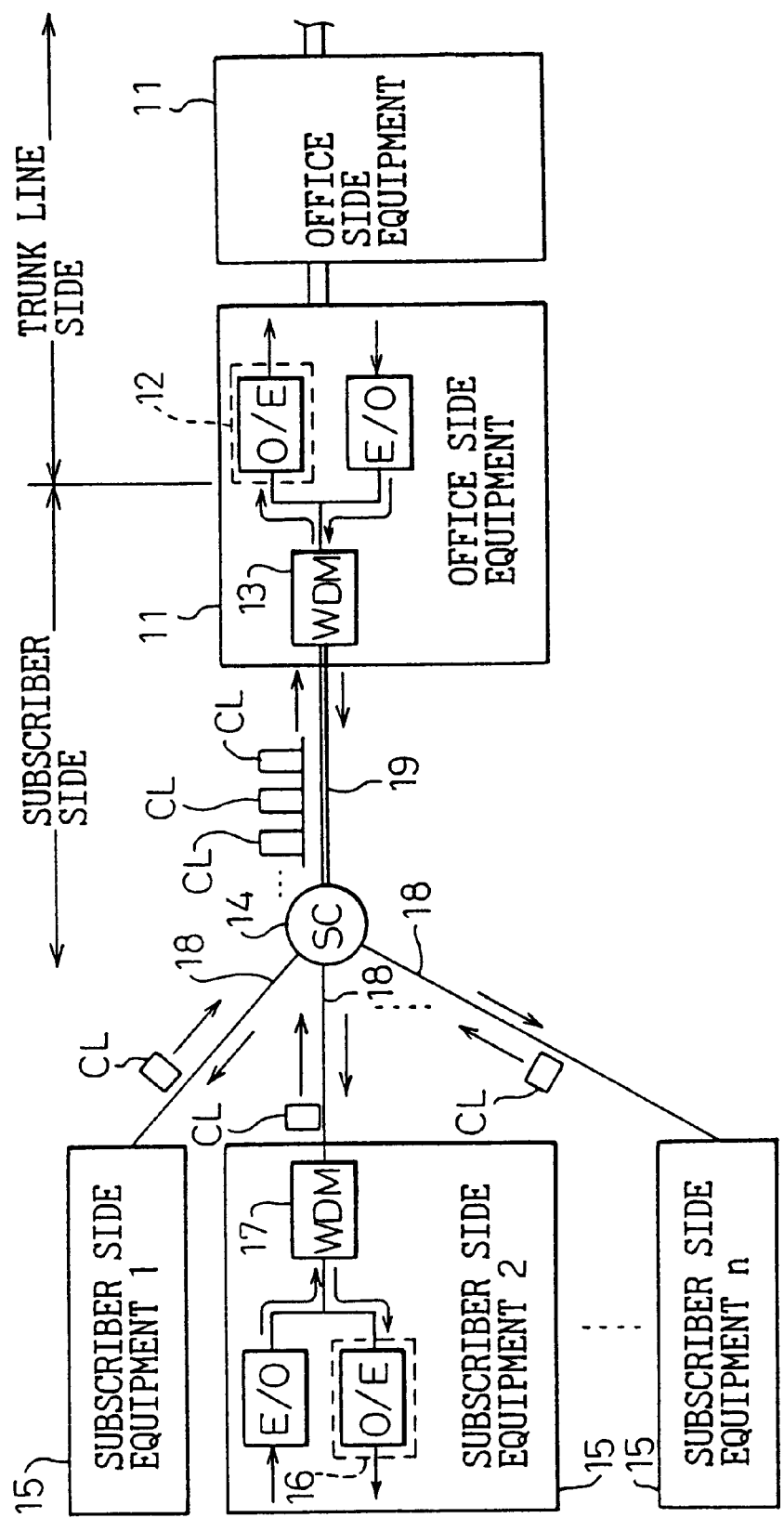
FIG. 17 is a view of an example of an optical data transmission system to which the retiming circuit of the present invention is applied.

FIG. 17 is a view of an example of an optical data transmission system to which the retiming circuit of the present invention is applied.

In the figure, 11 is office side equipment and constitutes a trunk line system in cooperation with the other office side equipment 11 shown at the right side in the figure. On the other hand, a subscriber system is formed in cooperation with the plurality of subscriber side equipment (No. 1, No. 2, . . . , No. n) 15 shown at the left side in the figure.

This subscriber system performs downstream optical transmission from the office side equipment 11 to each subscriber side equipment 15 and, reverse to the former, upstream optical transmission from each subscriber side equipment 15 to the office side equipment 11.

This upstream optical transmission is carried out by transmitting cell signals CL from the optical transmitting unit (indicated by an electro-optic converter "E/O" in the figure) in each subscriber side equipment 15 and a wavelength division multiplexer (WDM) 17 provided with a filtering function for preventing mutual interference with the downstream optical transmission. The cell signals CL pass through the individual optical fiber transmission lines 18, a star coupler (SC) 14, and a common optical fiber transmission line 19 common to the plurality of subscriber side equipment 15 to reach the office side equipment 11. Burst-like cell signals CL from each subscriber side equipment 15 are transmitted on this common optical fiber transmission line 19. Further, in the downstream transmission from the office side equipment 11 to each subscriber side equipment 15, a continuous cell signal train is sent to the transmission lines 19 and 18 and received at the optical receiving unit (indicated by the opto-electric converter "O/E") 16 via the wavelength division multiplexer (WDM) 17, where the logic "1" or "0" of the data contained in each cell signal is discriminated.

In the upstream optical transmission, the burst-like cell signals CL reaching the office side equipment 11 are received at the optical receiving unit (indicated by the opto-electric converter "O/E") 12 via the wavelength division multiplexer (WDM) 13 in the office side equipment 11, where the logic "1" or "0" of the data contained in each cell signal CL is discriminated. The retiming circuit according to the present invention is built in the optical receiving units 12 and 16.

In the optical transmission system, due to the internal configuration of the office side equipment 11 and the transmission lines 19 and 18, the duty of pulses comprising the input data Din received at the optical receiving unit 16—which originally should be 100 percent—sometimes becomes small, for example, 80 percent, or becomes large, for example, 120 percent.

Similarly, due to the internal configuration of the subscriber side equipment 15 and the transmission lines 18 and 19, the duty of the pulses comprising the input data Din received at the optical receiving unit 12, which also originally should be 100 percent, sometimes becomes small, for example, 80 percent, or becomes large, for example, 120 percent.

Under such a circumstance, if the retiming circuit 1 of the related art as exemplified in FIG. 16 is adopted, the two problems mentioned above occur.

Namely, first, there is the problem that, according to the retiming circuit 1 of the related art, the optimum phase clock (CLK) is selected by just the rising changing point of the input data (Din), therefore when there is the fluctuation in the duty, explained before, it is no longer possible to sample the center portion of a pulse. This is because the true center portion of the pulse must be determined by taking not only the rising changing point of the input data (Din), but also its falling changing point into account.

Second, there is the problem that, according to the retiming circuit 1 of the related art, it is difficult to sample the center portion of each pulse with an extremely high precision for all of various input data (Din) from the large number of subscriber side equipment. This is because, in the retiming circuit 1 of the related art, one optimum phase clock must be selected from among limited number of types of clocks (four, in the example of FIG. 16).

Accordingly, the present invention provides a retiming circuit and a method for performing retiming able to always discriminate the logic at the center portion of each pulse even if the duty of the pulses fluctuates and, at the same time, able to make the center portion of a pulse coincide with the clock without error to operate at a high speed.

Figure 1:
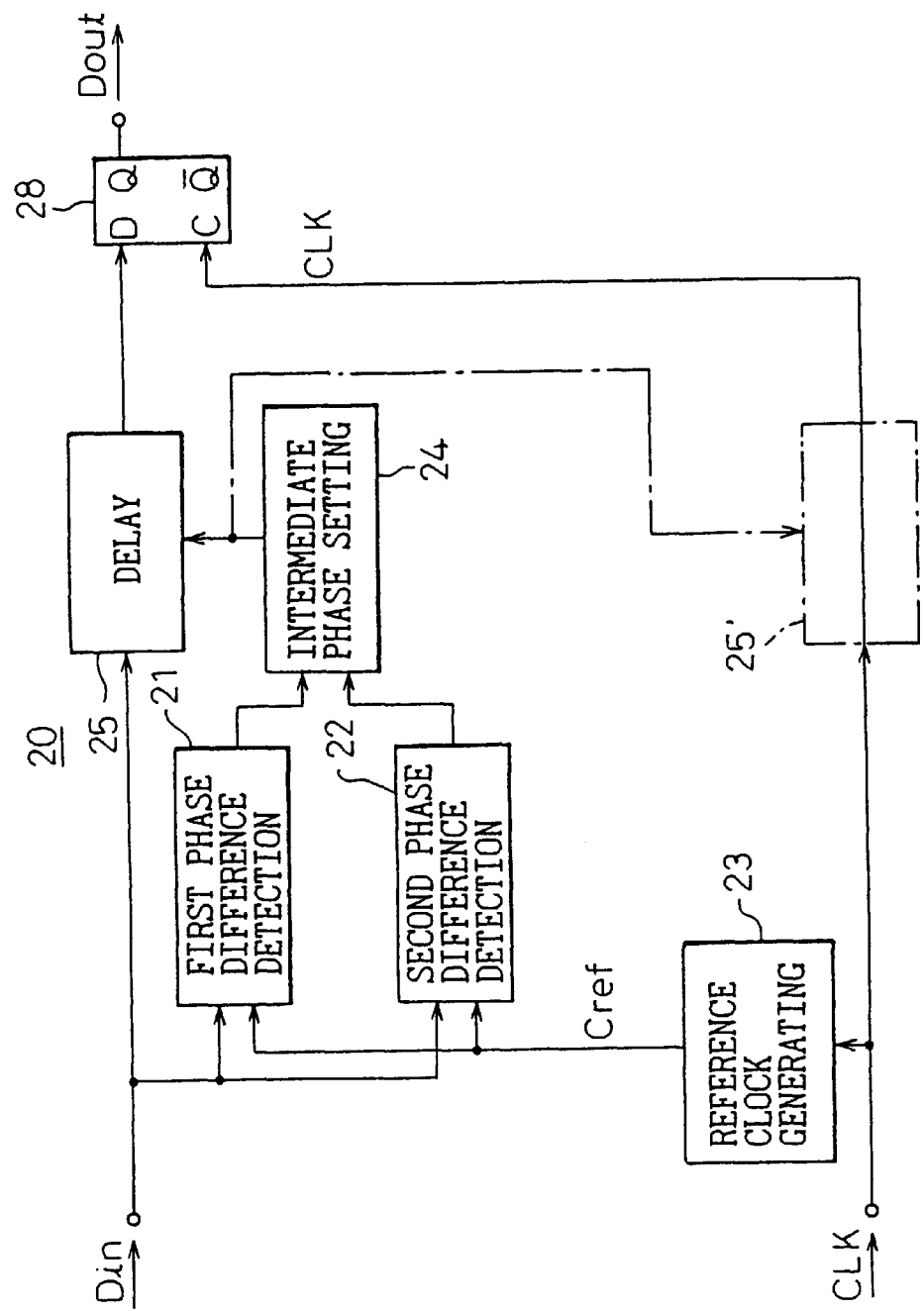
FIG. 1 is a view of the basic configuration of a retiming circuit according to the present invention.

FIG. 1 is a view of the basic configuration of the retiming circuit according to the present invention. In the figure, a retiming circuit 20 for sampling input data Din by a clock CLK and discriminating the logic "1" or "0" is constituted by providing, as illustrated, a first phase difference detection means 21, a second phase difference detection means 22, a reference clock generating means 23, an intermediate phase setting means 24, and a delay means 25. Reference numeral 28 is a D-flip-flop for sampling the input data Din by the clock CLK to obtain output data Dout. The functions of the above constituent elements 21 to 25 are as follows:

The delay means 25 (25') imparts variable delays to the input data Din or the clock CLK.

The reference clock generating means 23 generates a reference clock Cref synchronized with the clock CLK.

The first phase difference detection means 21 detects the phase difference between the rising edge of the reference clock Cref and the rising edge of the input data Din.

The second phase difference detection means 22 detects the phase difference between the rising edge of the reference clock Cref and the falling edge of the input data Din.

The intermediate phase setting means 24 calculates the intermediate phase between the rising edge and falling edge of the input data Din based on the outputs of the first phase difference detection means 21 and the second phase difference detection means 22.

Here, it becomes possible to always sample a pulse by the clock CLK correctly and at a high speed at the center portion of the above pulse irrespective of the fluctuation of duty of the pulse (Din) by controlling the amount of delay at the delay means 25 (25') according to the intermediate phase set by the intermediate phase setting means 24.

Note that adjustment by imparting a delay to the input data Din when adjusting the relative phase between the input data Din and the clock CLK is substantially equivalent to adjustment by imparting a delay to the clock CLK. In FIG. 1, the delay means 25 is used in the former case, and the delay means 25' is used in the latter case. Note that the following explanation will be made taking as an example a case where a delay is imparted to the input data Din for adjustment.

The technical concept of the present invention mentioned above can also be understood as a method for performing retiming.

Figure 2:
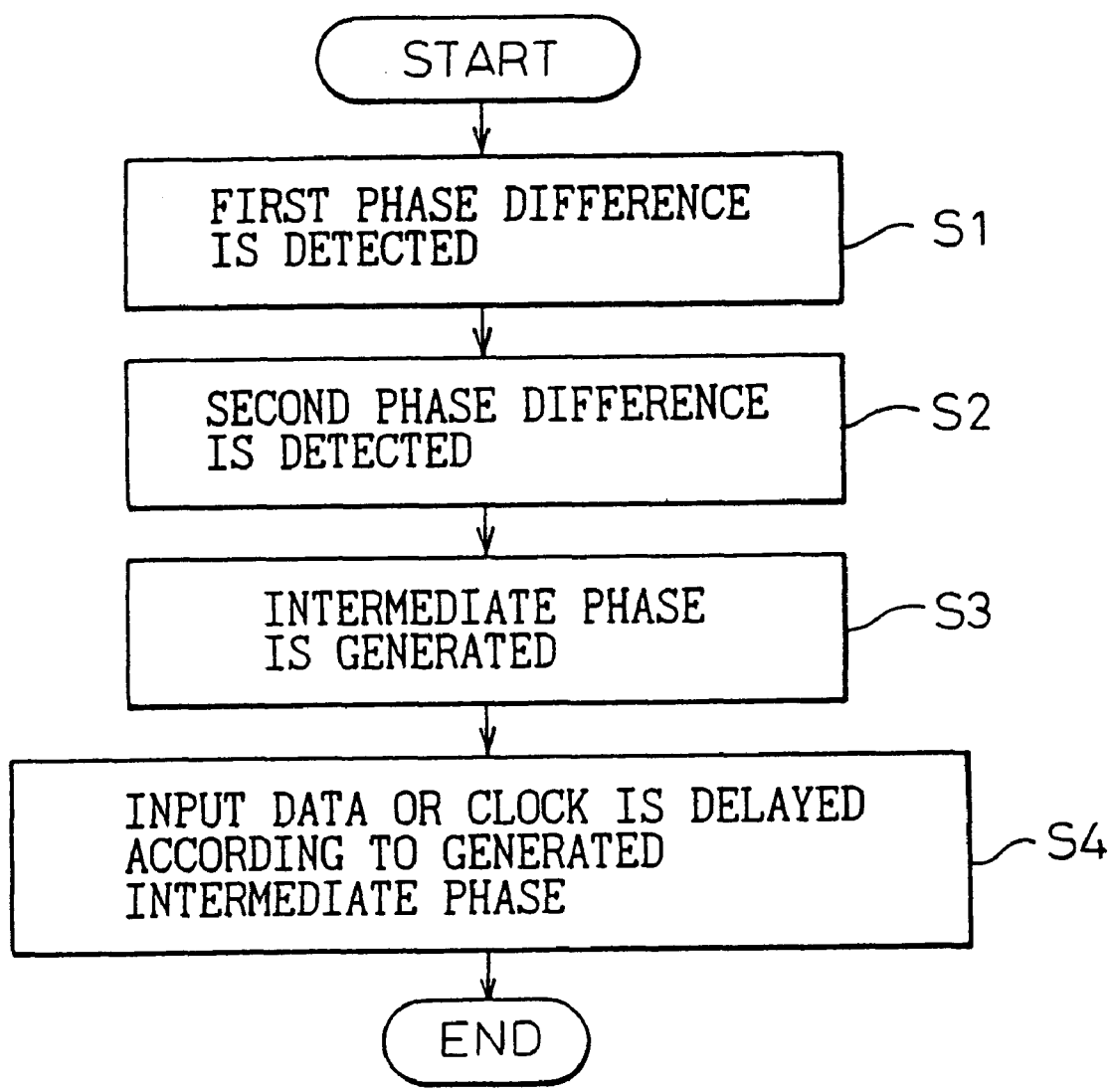
FIG. 2 is a flowchart representing a method for performing retiming according to the present invention.

FIG. 2 is a flowchart of the method for performing retiming according to the present invention. The steps are explained below.

That is, according to the present invention, there is provided a method for performing retiming which samples input data Din by a clock CLK and discriminates the logic "1" or "0", comprising:

Step 1 (S1): Detecting a first phase difference from the rising edge of the reference clock Cref generated in synchronization to the clock CLK to the rising edge of the input data Din;

Step 2 (S2): Detecting a second phase difference from the rising edge of the reference clock Cref to a falling edge of the input data Din;

Step 3 (S3): Generating the intermediate phase between the first phase difference and the second phase difference; and Step 4 (S4): Imparting a delay to the input data Din (or the clock CLK) according to the magnitude of the intermediate phase.

Figure 3A:
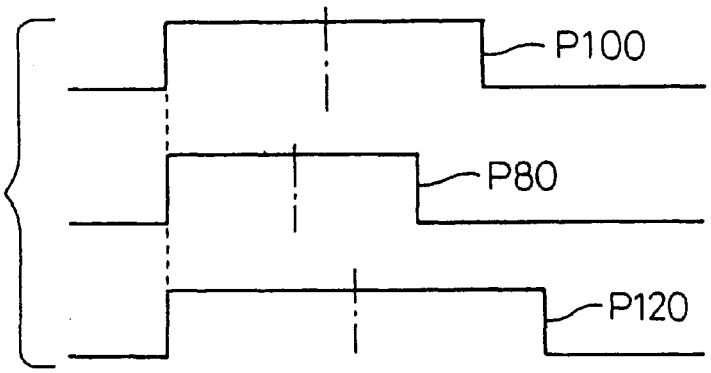
FIGS. 3A and 3B are views of waveforms representing the situation of setting an intermediate phase in the case of the present invention and in the case of the related art, respectively.
Figure 3B:
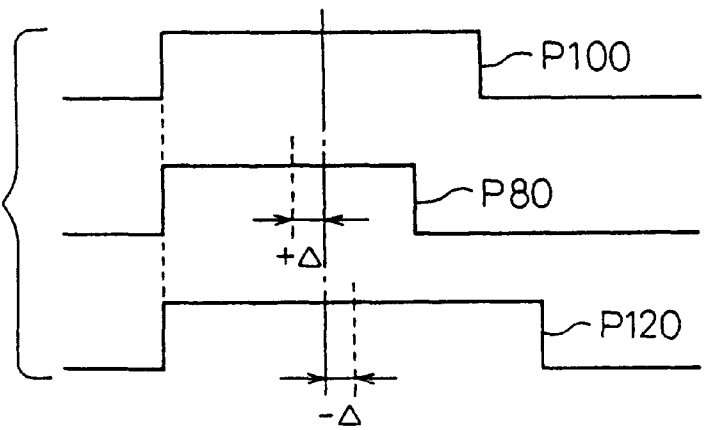

FIGS. 3A and 3B are views of waveforms showing the situation when setting the intermediate phase in the case of the present invention and the case of the related art, respectively.

The "P" in the P80, P100, and P120 in the figure represents a pulse forming the input data Din, while the "80", "100", and "120" represent the duties 80 percent, 100 percent, and 120 percent, respectively.

Viewing FIG. 3B, in the related art, the length of time from the header portion of the standard pulse P100 to the center portion thereof (represented by a dotted line shown at the center of each pulse) is defined as the optimum phase when the input data Din is sampled by the clock CLK. Therefore, when the pulse P80 appears due to duty fluctuation, the actual sampling phase is deviated from the optimum phase by exactly an amount of $+\Delta$. Conversely, when the pulse P120 appears, the actual sampling phase is deviated from the optimum phase by exactly an amount of $-\Delta$.

As opposed to this, viewing FIG. 3A, in the case of the present invention, the actual sampling phase is set without any deviation of the center portion (optimum phase) not only in the case of the pulse P100, but at times of both the pulse P80 and the pulse P120. This is because the sampling phase is set by taking not only the phase of the rising edge of the pulse, but also the phase of the falling edge into account.

Figure 4:
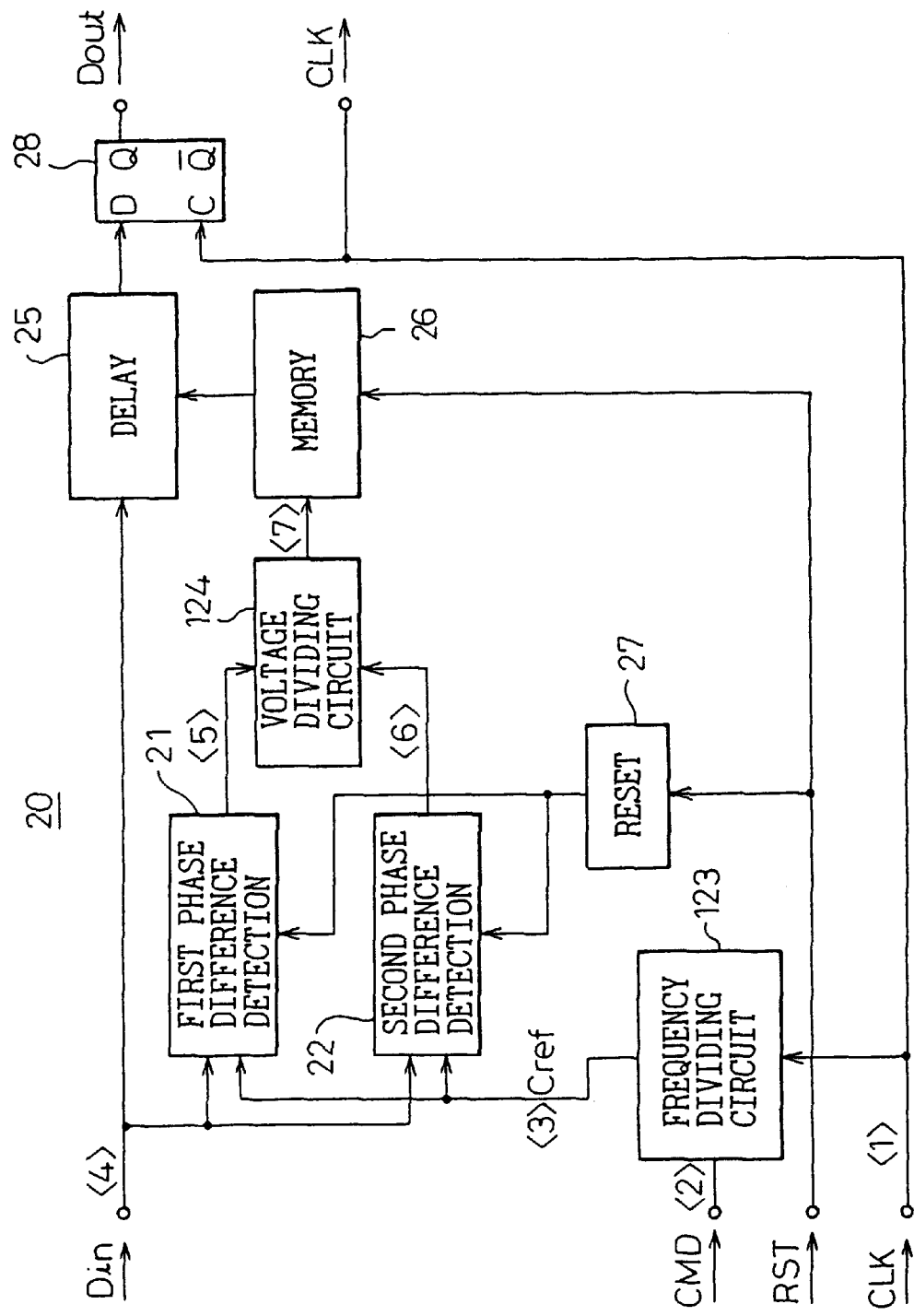
FIG. 4 is a view of a first embodiment of the present invention.

FIG. 4 is a view of a first embodiment of the present invention. In the figure, the above reference clock generating means 23 comprises a frequency dividing circuit 123 for dividing the input clock CLK and outputting the same as the reference clock Cref.

This frequency dividing circuit 123 (reference clock generating means 23) receives a command signal CMD for specifying the period during which the control of the delay by the delay means 25 should be executed and executes or stops the control of the delay according to the command signal CMD.

Further, the intermediate phase setting means 24 comprises a voltage dividing circuit 124 for dividing the sum of voltages of analog outputs from the first phase difference detection means 21 and the second phase difference detection means 22 by about 2.

Further, as constituent elements not shown in FIG. 1, a memory means 26 and a reset means 27 are shown.

The memory means 26 stores intermediate phase information regarding the intermediate phase set by the intermediate phase setting means (voltage division circuit 124) 24 and supplies the stored intermediate phase information to the delay means 25.

Further, the reset means 27 resets each phase difference detected at the first phase difference detection means 21 and the second phase difference detection means 22 to an initial value.

The memory means 26 receives a reset signal RST input when the control of the delay amount should be ended.

Further, the reset means 27 operates after receiving the reset signal RST input when the control of the delay amount should be ended.

The reset means 27 clears the information of the phase differences detected at the first and second phase difference detection means 21 and 22 when the reset signal RST is input. Namely, the means 27 returns them to initial states for the pulse which will arrive next.

The memory means 26 clears the stored intermediate phase information by the reset signal RST. Note that the delay means 25 (25') receiving this intermediate phase information as the control input can be constituted by for example a voltage controlled delay element and changes the amount of delay of the input data Din according to the value of the control voltage (the above control input) being input.

Figure 5:
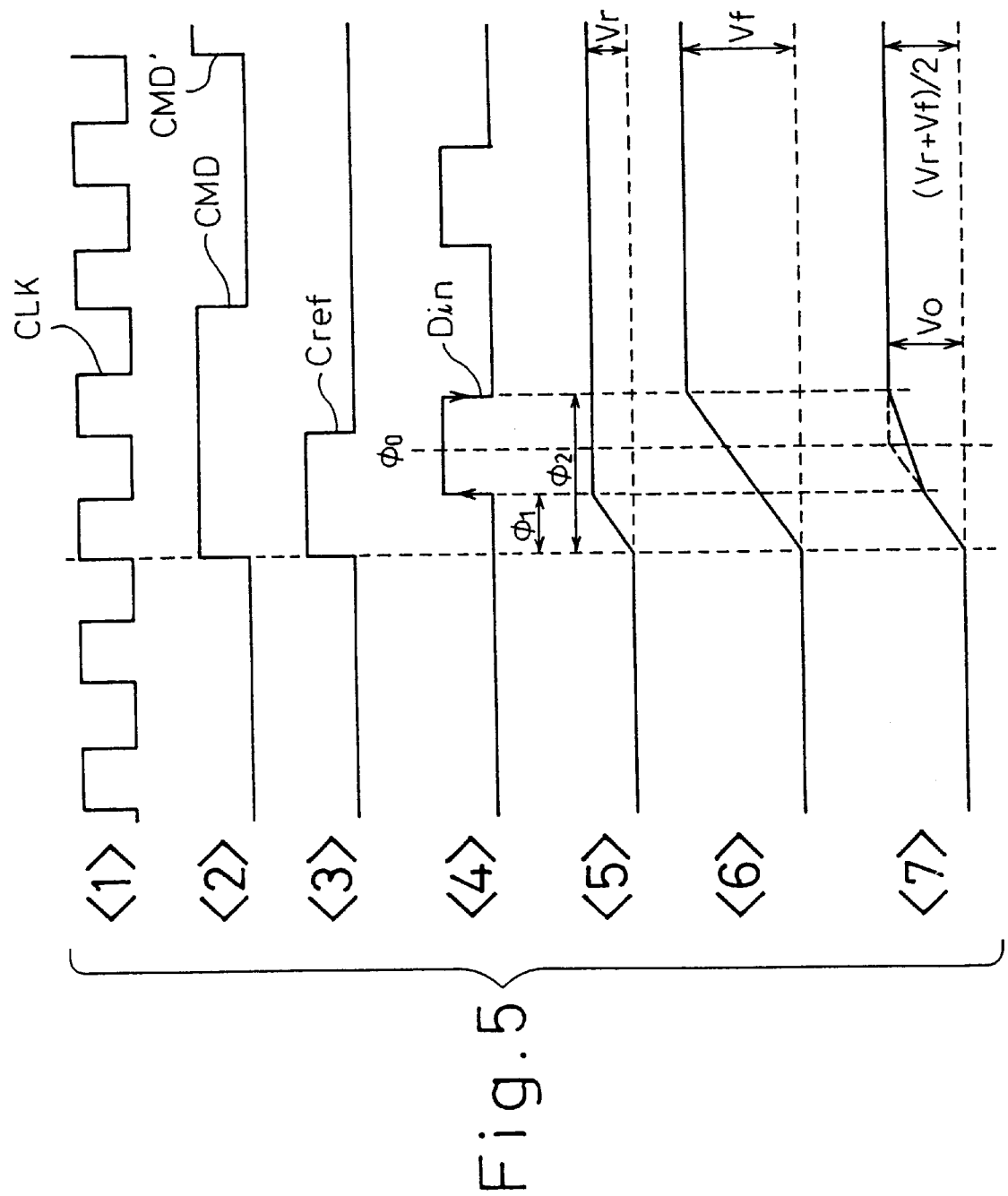
FIG. 5 is a waveform diagram of the operation of the circuit shown in FIG. 4.

The operation of the present invention will become clearer referring to FIG. 5.

FIG. 5 is a waveform diagram explaining the operation of the circuit shown in FIG. 4. The waveforms shown by <1>, <2>, . . . <7> of the figure are the signal waveforms appearing at <1>, <2>, . . . <7> of FIG. 4, respectively. Referring to both of FIG. 4 and FIG. 5, assume that the clock CLK shown in <1> of FIG. 5 is supplied to the retiming circuit 20 and that the input data Din having the logic "1" or "0" to be discriminated is given as in <4> of FIG. 5. This retiming circuit 20 preferably operates every time a command signal CMD based on an instruction from the outside, for example, an indication of the operator, is input. This command signal CMD is shown in <2> of FIG. 5. After this, the retiming operation of the present invention, starts.

First, upon receipt of the command signal CMD, the frequency dividing circuit 123 divides the clock CLK and generates the reference clock Cref. As shown in <3> of FIG. 5, ½ frequency division is preferred. This is because, by doubling the cycle of the clock, it is possible to produce only one rising point of the clock serving as the reference phase within the command signal CMD.

Upon receipt of the reference clock Cref and the input data Din, the first phase difference detection means 21 transforms a time (first phase difference $\Theta 1$) from the rising edge of Cref to the rising edge of Din to a voltage Vr corresponding to $\Theta 1$ and holds this Vr (<5> of FIG. 5).

Similarly, upon receipt of the reference clock Cref and the input data Din, the second phase difference detection means 22 transforms a time (second phase difference $\Theta 2$) from the rising edge of Cref to the falling edge of Din to a voltage Vf corresponding to $\Theta 2$ and holds this Vf (<6> of FIG. 5).

What the retiming circuit 20 now tries to find is the optimum phase (optimum sampling phase) $\Theta_0$ located at the center portion of the input data Din. Therefore, a voltage $V_0$ corresponding to the optimum phase $\Theta_0$ is generated from the voltages Vr ($\Theta_1$) and Vf ($\Theta_2$). This is done by the voltage dividing circuit 124. By this, the voltage $V_0$ shown in <7> of FIG. 5 is output.

Here, $$V_0 = (Vr + Vf)/2 \qquad (1)$$

The voltage $V_0$ of ½ of Vr and Vf defines the intermediate phase $\Theta_0$ of $\Theta_1$ and $\Theta_2$. More particularly, the voltage $V_0$ corresponds to the sum of the voltage Vr and ½ of the voltage of the difference between the voltage Vf and the voltage Vr. That is, $$V_0 = (Vf - Vr)/2 + Vr \quad (2)$$

This becomes:

$$V_0 = (Vf + Vr)/2 \quad (3)$$

which gives the above equation (1).

This voltage $V_0$ is held in the memory means 26 and controls the delay of the delay element 25.

Next, when the command signal (CMD' in <2> of FIG. 5) is given, first the reset signal RST is input, the contents in the memory means 26 are cleared, the voltages Vr and Vf are reset, and an operation similar to that mentioned above is carried out.

Figure 6:
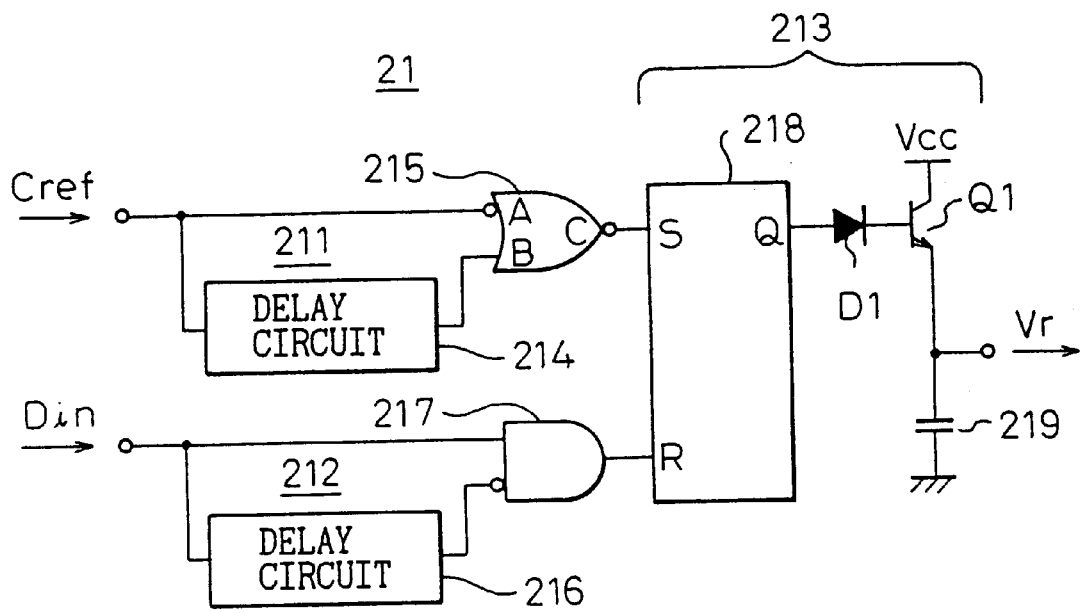
FIG. 6 is a view of an example of a first phase difference detection means.
Figure 7:
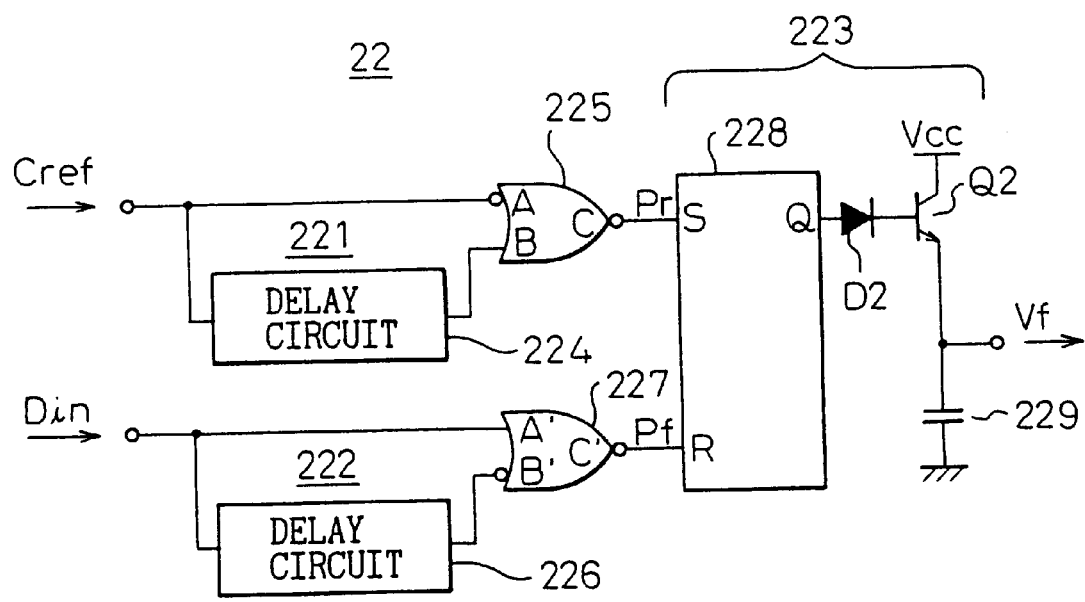
FIG. 7 is a view of an example of a second phase difference detection means.

FIG. 6 is a view of an example of the first phase difference detection means; and FIG. 7 is a view of an example of the second phase difference detection means.

In FIG. 6, the first phase difference detection means 21 comprises a first clock rising detection circuit 211 for detecting the rising edge of the reference clock Cref, a data rising detection circuit 212 for detecting the rising edge of the input data Din, and a first voltage producing circuit 213 for receiving as its inputs the outputs of the first clock rising detection circuit 211 and the data rising detection circuit 212 and outputting the first voltage Vr substantially proportional to the period from the rising edge of the reference clock Cref to the rising edge of the input data Din.

The first clock rising detection circuit 211 comprises a delay circuit 214 and a NOR gate 215.

The data rising detection circuit 212 comprises a delay circuit 216 and an AND gate 217.

The first voltage producing circuit 213 comprises an RS-flip-flop 218, a capacitor 219 controlled in charging by a transistor Q1, and a discharge preventing diode D1.

Next, referring to FIG. 7, the second phase difference detection means 22 comprises a second clock rising detection circuit 221 for detecting the rising edge of the reference clock Cref, a data falling detection circuit 222 for detecting the falling edge of the input data Din, and a second voltage producing circuit 223 for receiving as its inputs the outputs of the second clock rising detection circuit 221 and the data falling detection circuit 222 and outputting the second voltage Vf substantially proportional to the period from the rising edge of the reference clock Cref to the falling edge of the input data Din.

The second clock rising detection circuit 221 comprises a delay circuit 224 and a NOR gate 225.

The data falling detection circuit 222 comprises a delay circuit 226 and a NOR gate 227.

The second voltage producing circuit 223 comprises an RS-flip-flop 228, a capacitor 229 controlled in charging by a transistor Q2, and a discharge preventing diode D2.

The first phase difference detection means 21 (FIG. 6) and the second phase difference detection means 22 (FIG. 7) are basically the same in operation, therefore the explanation of the operation thereof will be made by using the second phase difference detection means 22 as a representative case.

Figure 8:
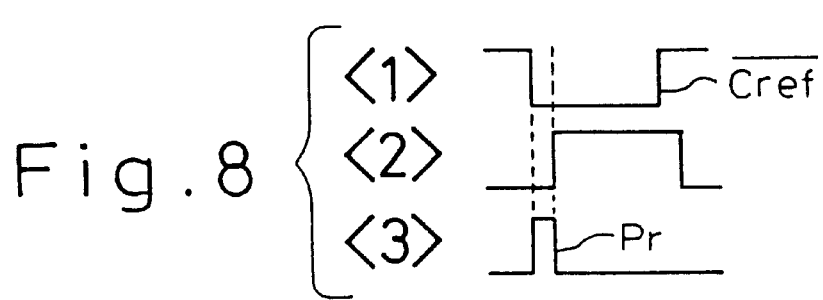
FIG. 8 is a timing chart of the operation of a second clock rising edge detection circuit 221.

FIG. 8 is a timing chart showing the operation of the second clock rising detection circuit 221. As a result of the operation, a pulse Pr (shown in <3> of the figure) corresponding to the rising edge of the reference clock Cref is output from the NOR gate 225. For this reason, the NOR gate 225 receives the inverted pulse of the original reference clock Cref shown in <1> of the figure and the delayed Cref shown in <2> of the figure.

Figure 9:
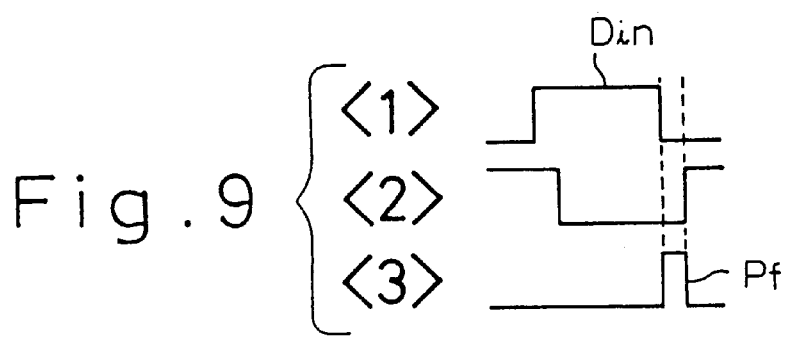
FIG. 9 is a timing chart of the operation of a data falling edge detection circuit 222.

FIG. 9 is a timing chart of the operation of the data falling detection circuit 222. As a result of the operation, a pulse Pf (shown in <3> of the figure) corresponding to the falling edge of the input data Din is output from the NOR gate 227. For this reason, the NOR gate 227 receives the original input data Din shown in <1> of the figure and the delayed Din shown in <2> of the figure.

Figure 10:
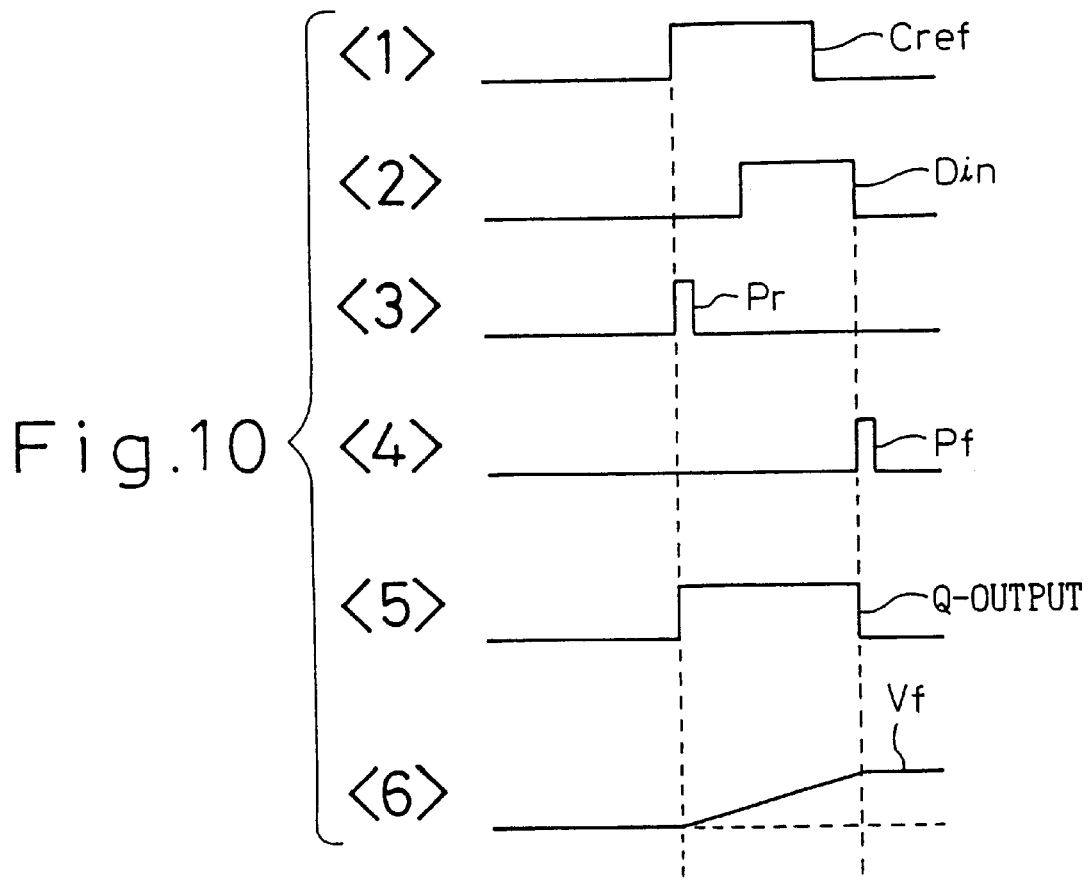
FIG. 10 is a waveform diagram of the steps for producing a second voltage Vf in the second phase difference detection means.

FIG. 10 is a waveform diagram of the process for producing the second voltage Vf in the second phase difference detection means. <1> and <2> of the figure are the reference clock Cref and the input data Din already mentioned. <3> and <4> of the figure are the pulses Pr and Pf shown in FIG. 8 and FIG. 9.

Explaining this by referring to FIG. 7, the RS-flip-flop 228 receiving the pulse Pr at its set input S outputs a signal of the logic "1" level (high level) from its Q output (refer to <5> of FIG. 10). This high level signal turns the transistor Q2 on and charges the capacitor 229. This changing voltage, that is, the second voltage Vf changes as in <6> of FIG. 10. Note that this second voltage Vf is exactly the same as Vf shown in <6> of FIG. 5. Thus, a voltage corresponding to the second phase difference $\Theta_2$ is obtained.

The first phase difference detection means 21 operates in the same way as that explained above. Note that the output pulse from the data rising detection circuit 212 (FIG. 6) indicating the rising edge of the input data Din is used in place of the pulse Pf.

Figure 11:
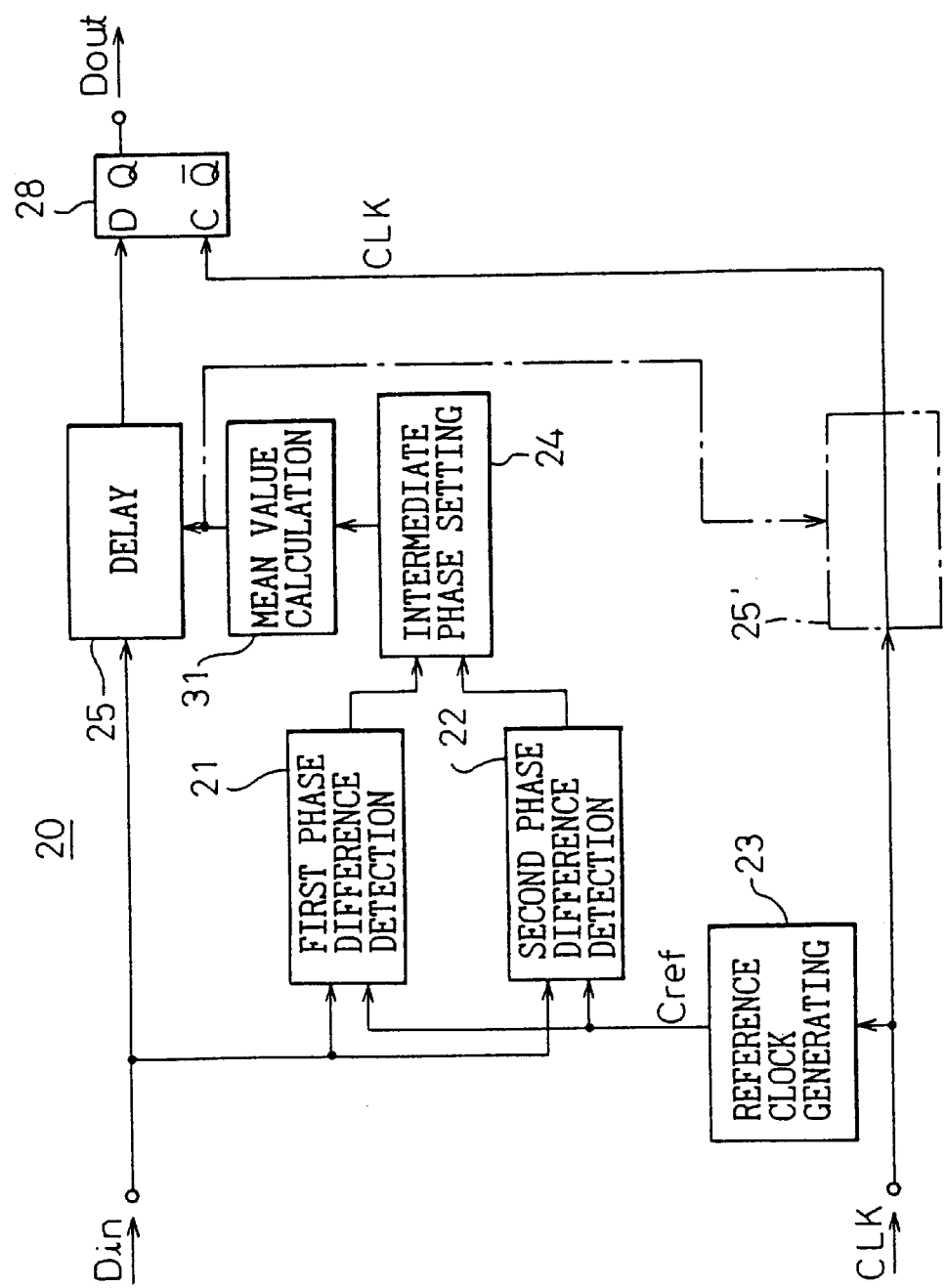
FIG. 11 is a view of a second embodiment of the present invention.

FIG. 11 is a view of a second embodiment of the present invention. The characteristic feature of this second embodiment resides in that a mean value calculating means 31 is introduced.

This mean value calculating means 31 supplies, to the delay means 25 (25'), the value obtained by dividing the output of the intermediate phase setting means 24 by N, which output is obtained by detecting the phase differences at the first phase difference detection means 21 N number of times and detecting the phase differences at the second phase difference detection means 22 N number of times for N number of reference clocks Cref.

Figure 12:
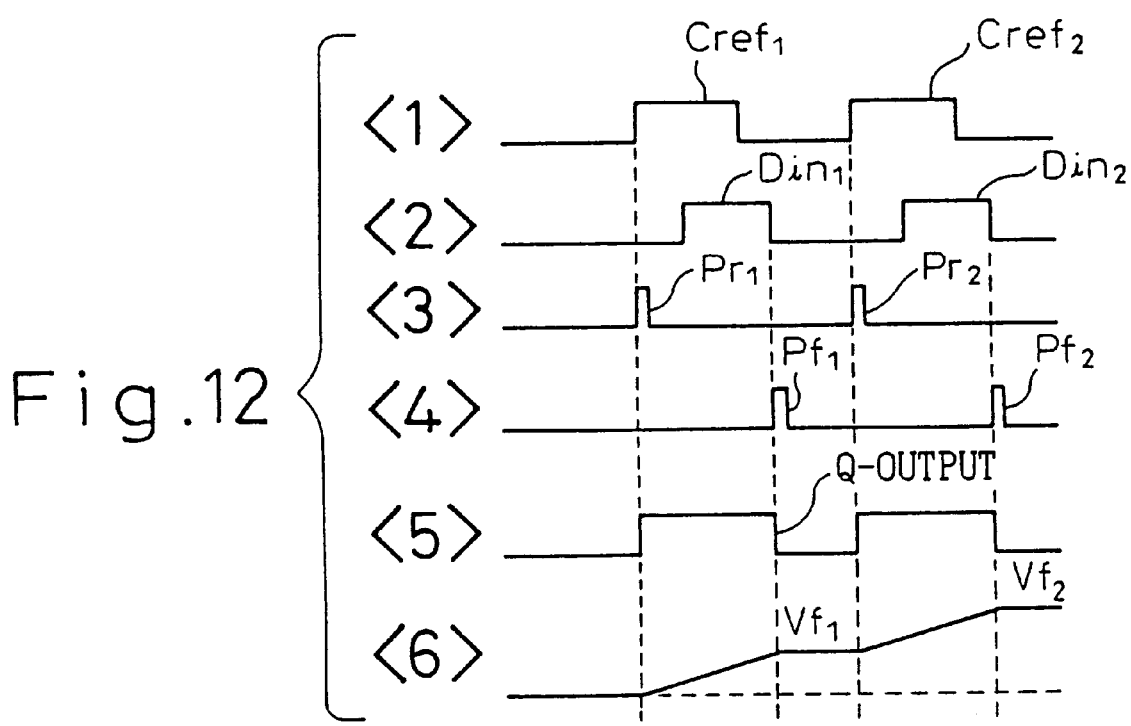
FIG. 12 is a waveform diagram for explaining the second embodiment of FIG. 11.

FIG. 12 is a waveform diagram explaining the second embodiment of FIG. 11 and corresponds to FIG. 10 mentioned above. Note that the figure shows an example where the phase difference is detected twice to correspond with the two reference clocks Cref, that is, an example of N=2. According to the present embodiment, the precision of the phase detection can be increased relative to the case of the first embodiment.

For the two elements explained above, in FIG. 12, 1 and 2 are attached as suffixes to differentiate them. For example, they are attached as shown by Cref1 and Cref2, Pr1 and Pr2, Pf1 and Pf2, and Vf1 and Vf2. In the end, Vf which is found by Vf2÷2 is used. The same is true for Vr.

Figure 13:
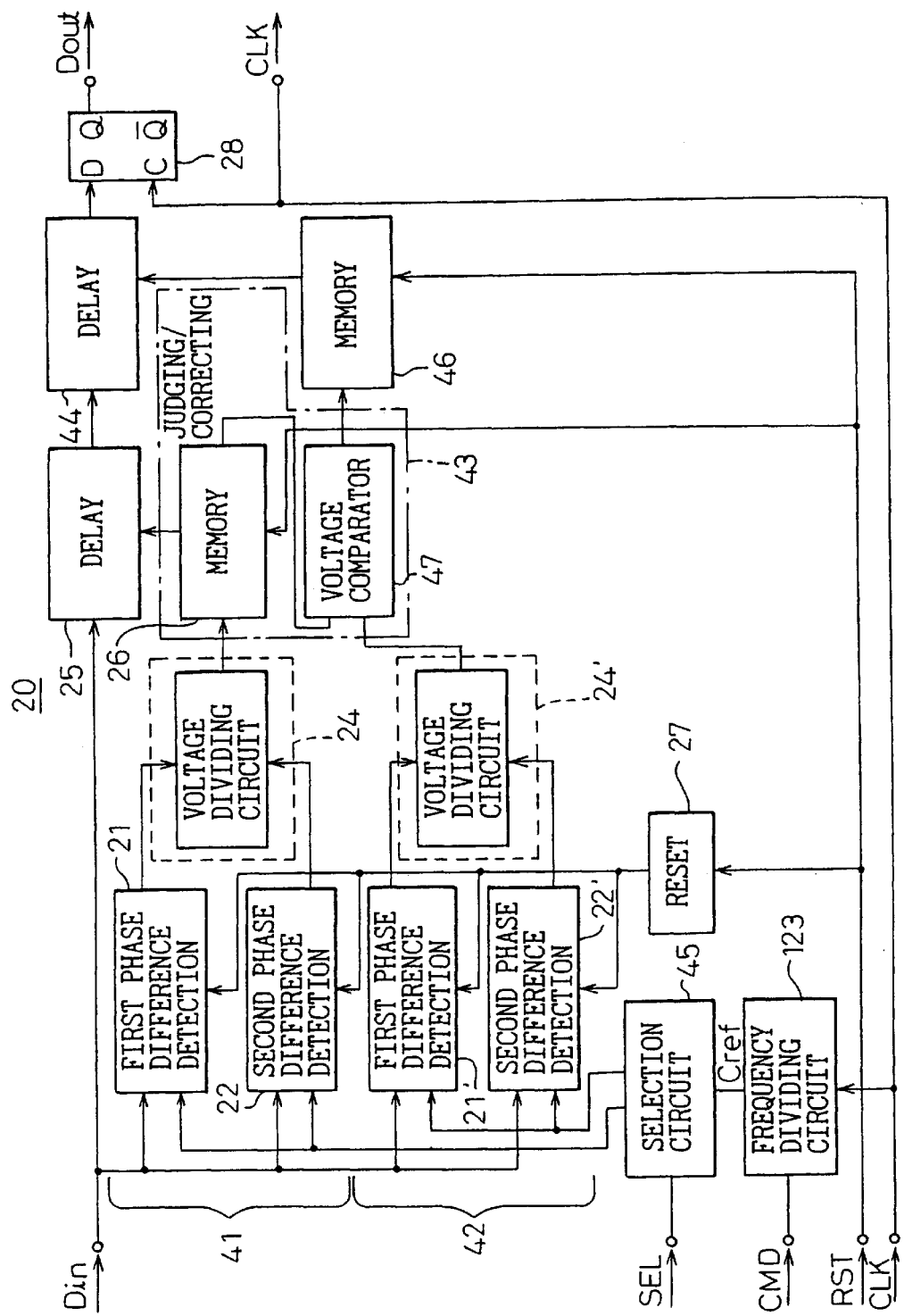
FIG. 13 is a view of a third embodiment according to the present invention.

FIG. 13 is a view of a third embodiment according to the present invention. The principal characteristic feature of the third embodiment resides in the provision of a first intermediate phase generating unit 41 constituted by the first phase difference detection means 21, second phase difference detection means 22, and the intermediate phase setting means 24 and of a second intermediate phase generating unit 42, arranged in parallel with the above unit 41, having the identical structure to that of this first intermediate phase generating unit 41, i.e., constituted by the first phase difference detection means 21', the second phase difference detection means 22', and the intermediate phase setting means 24' and of a judging/correcting unit 43 for judging the optimum intermediate phase among the received outputs from the first and second intermediate phase generating units 41 and 42 and correcting the delay of the delay means 25. Note that the intermediate phase generating units are not limited to two. It is also possible to provide three or more.

This third embodiment can produce a phase delay which is more correct than the second embodiment can be obtained.

Namely, a preciser phase delay is realized. This is realized by adding for example a sub-delay means 44 to the main delay means 25. The amount of delay of this delay means 44 is determined by the judging/correcting unit 43.

Other than this, the element newly introduced in FIG. 13 is the selection circuit 45. This distributes the reference clock Cref to specify the reference clocks Cref which should be input to the first intermediate phase generating unit 41 or the second intermediate phase generating unit 42. This is done in accordance with a selection signal SEL from the outside (for example, an operator).

In the present embodiment, the judging/correcting unit 43 is realized by a memory unit 46 and a voltage comparator 47 as one example. The operation will be explained according to this example of the configuration.

According to the selection signal SEL, the selection circuit 45 first sends the reference clock Cref from the frequency dividing circuit 123 to the first intermediate phase generating unit 41 and outputs the voltage ($V_O$) corresponding to the optimum phase ($\Theta_O$) from the generating unit 41 as already mentioned. The first information (analog) representing this voltage ($V_O$) is held once in the memory means 26.

Next, the selection signal SEL sends the reference clock Cref from the frequency dividing circuit 123 to the second intermediate phase generating unit 42 and outputs the voltage ($V_O$) corresponding to the optimum phase ($\Theta_O$) from the generating unit 42 as already mentioned. The second information (analog) representing this voltage ($V_O$) is compared with the first information at the voltage comparator 47.

If the first information coincides with the second information, this first information is regarded as reliable and no data is written into the memory unit 46.

If there is a difference between the first information and the second information, the information of the difference, together with a positive or negative sign, is held in the memory unit 46. Then, the delay for correction is indicated to the delay means 44 based on this difference.

In this case, there is the requisite condition that the second information be more correct than the first information. For this reason, if the first information is obtained by the process shown in FIG. 10, the second information is obtained by the more precise process shown in FIG. 12. Note that the time for obtaining the second information becomes longer than the time for obtaining the first information.

For this reason, it is preferred that the first information be used for high speed coarse setting and the second information be used for low speed fine adjustment.

One method of determination at the judging/correcting unit 43 is, as mentioned above, using the coarse first information as well as the high precision second information.

Various other methods can be considered for the above determination. For example, there is also the procedure of providing an odd number of intermediate phase generating units (not illustrated) in addition to the first and second intermediate phase generating units 41 and 42 and making the decision based on a majority of the outputs of these generating units.

Here, paying attention to the clock CLK, there are a variety of modes of generation. These are the following i) to iv).

i) Using as the clock CLK an external clock given from the outside or an internal clock generated inside the retiming circuit 20.

ii) Obtaining the internal clock by a clock component extracted from a clock extracting unit 55 from the input data Din.

iii) Generating the internal clock by a self-excited oscillating circuit 54.

iv) Providing an input unit 51 of the external clock and a generating unit 52 of the internal clock and obtaining a clock from a selecting unit 53 by selecting one of the outputs of the external clock input unit and the generating unit of the internal clock.

Figure 14:
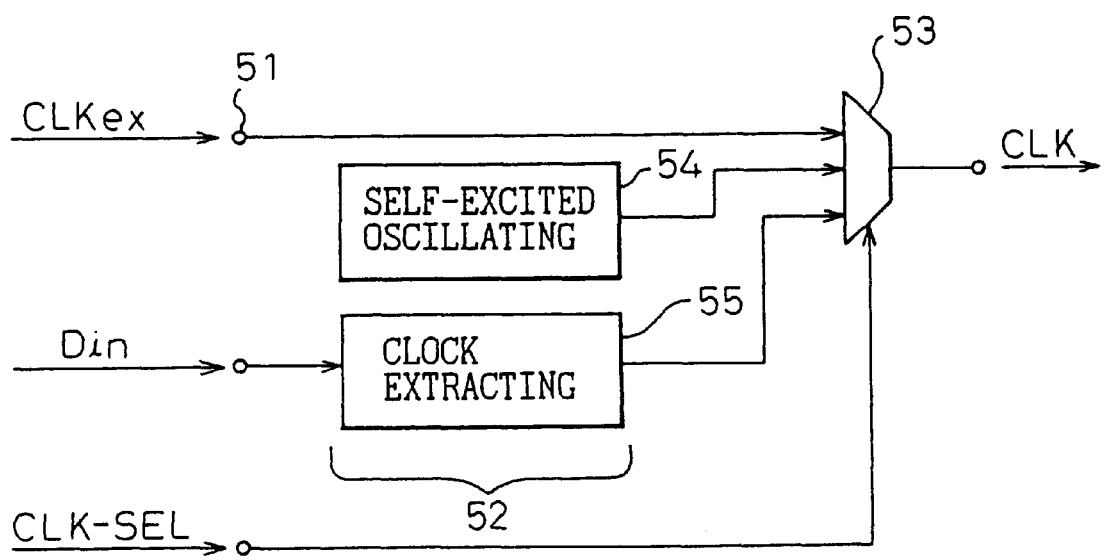
FIG. 14 is a view of the basic configuration of a clock generating circuit.

FIG. 14 is a view of the basic configuration of the generation circuit of the clock which covers all of the modes i) to iv).

In FIG. 14, the selecting unit 53 is connected to three types of clock sources, selects one by a clock selection signal CLK-SEL, and defines this as the clock CLK.

These three types of clock sources are the input part 51 of the external clock CLKex, the output clock from the self-excited oscillating circuit 54, and the output clock from the clock extracting unit 55 for extracting a clock from the input data Din. Note that the self-excited oscillating circuit 54 and the clock extracting unit 55 belong to the internal clock generating part 52.

Referring to FIG. 17, the office side equipment 11 contains a master clock source, therefore it is sufficient for the equipment 11 to use the external clock CLKex of FIG. 14 as the clock CLK, but in each subscriber side equipment 15 not having such a master clock, it is possible to use the internal clock generating part 52 of FIG. 4 (54 or 55) as the clock CLK.

Figure 15:
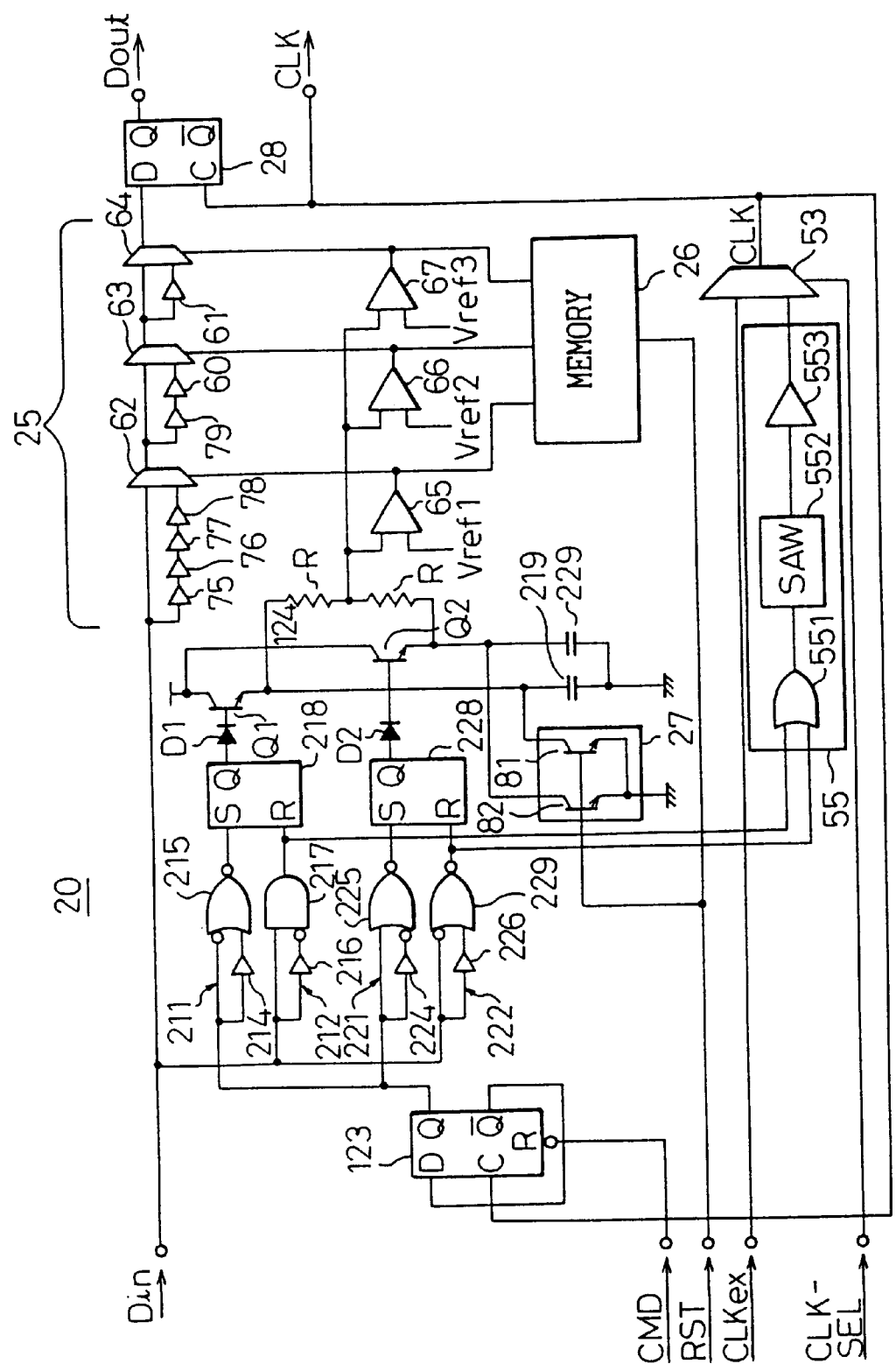
FIG. 15 is a view of a detailed example of the retiming circuit according to the present invention.

FIG. 15 is a view of a detailed example of the retiming circuit according to the present invention. Constituent elements similar to those already explained are indicated by same reference numerals or symbols. The operation of the circuit of FIG. 15 is self-evident from the explanation heretofore, therefore only the part newly disclosed in the figure will be clarified.

The D-flip-flop located at the left end of FIG. 15 constitutes the frequency dividing circuit 123.

The gates 214, 216, 224, and 226 shown at the Q-output side of the D-flip-flop constitute the already mentioned delay circuit.

The voltage dividing circuit 124 at the latter stage thereof comprises two serial resistors R.

The constituent elements at the latter stage of the serial resistors R constitute the delay means 25. This delay means 25 is largely divided into two. One is arranged along the transfer line of the input data Din, i.e., an actual delay part comprising gates 75 to 78, 79, 60, and 61 and selectors 62, 63, and 64. The other is a set of comparators 65, 66, and 67 designating the delay.

The comparators 65, 66, and 67 each have unique reference voltages Vref1, Vref2, and Vref3 and output (0, 0, 0), (0, 0, 1), (0, 1, 0), . . . in accordance with the magnitude of the output voltage ($V_O$) from the voltage dividing circuit 124. These (0, 0, 0), (0, 0, 1), (0, 1, 0), . . . control the selectors 62, 63, and 64. That is, they select the upper route or lower route of each selector. The delay of the upper route is zero as illustrated. On the other hand, the lower route imparts, to the input data Din, four stages' worth of delay by the selector 62, two stages' worth of delay by the selector 63, and one stage worth of delay by the selector 64.

If only the comparator 65 outputs "1", four stages' worth of delay is obtained.

If only the comparators 63 and 64 output "1", three (=2+1) stages' worth of delay is obtained.

If all comparators output "1", the maximum of seven (=4+2+1) stages' worth of delay is obtained.

Capacitors 219 and 229 supply the voltage to the voltage dividing circuit 124. A reset circuit 27 performing the discharge thereof comprises transistors 81 and 82.

The internal clock generating part 55 explained referring to FIG. 14 comprises an OR gate 551 receiving as its input the synchronization signal of the input data Din, a SAW filter 552 for selecting only the desired frequency band, and an amplifier 553. The output of the selector 53 is supplied to the clock input C of the D-flip-flop 28.

As explained above, according to the present invention, even if the duty of the pulse of the input data fluctuates, the pulse can be always sampled at its center portion, and thus the logic "1" and "0" can always be correctly discriminated.

While the invention has been described with reference to specific embodiments chosen for purposes of illustration, it should be apparent that numerous modifications could be made thereto by those skilled in the art without departing from the basic concept and scope of the invention.

What is claimed is:

1. A retiming circuit for sampling input data by a clock and discriminating a logic "1" and "0", comprising:

a delay means for applying a variable delay to said input data or said clock;

a reference clock generating means for generating a reference clock synchronized with said clock;

a first phase difference detection means for detecting a phase difference between a rising edge of said reference clock and a rising edge of said input data;

a second phase difference detection means for detecting the phase difference between the rising edge of said reference clock and a falling edge of said input data;

an intermediate phase setting means for calculating an intermediate phase between the rising edge and falling edge of said input data based on outputs of said first phase difference detection means and said second phase difference detection means, said delay amount at said delay means being controlled based on said intermediate phase set by said intermediate phase setting means; and a memory means for storing intermediate phase information regarding said intermediate phase set by said intermediate phase setting means and supplying the stored intermediate phase information to said delay means.

2. A retiming circuit according to claim 1, further having a resetting means for returning said phase differences detected at said first phase difference detection means and said second phase difference detection means to initial values.

3. A retiming circuit according to claim 1, wherein said reference clock generating means comprises a frequency dividing circuit for dividing input said clock and outputting the divided clock as said reference clock.

4. A retiming circuit according to claim 1, wherein said intermediate phase setting means comprises a voltage dividing circuit for dividing the voltage of the sum of analog outputs from said first phase difference detection means and said second phase difference detection means by about 2.

5. A retiming circuit according to claim 1, wherein said reference clock generating means receives a command signal for specifying a period during which the control of said delay should be executed and executes or stops the control of the delay according to the command signal.

6. A retiming circuit according to claim 1, wherein said memory means operates after receiving the reset signal input when the control of said delay should be ended.

7. A retiming circuit according to claim 2, wherein said resetting means receives the reset signal input when the control of said delay should be ended.

8. A retiming circuit according to claim 1, wherein said first phase difference detection means comprises:

a first clock rising detection circuit for detecting the rising edge of said reference clock;

a data rising detection circuit for detecting the rising edge of said input data; and a first voltage producing circuit for outputting the first voltage substantially proportional to the period from the rising edge of said reference clock to the rising edge of said input data by receiving as its input the outputs of said first clock rising detection circuit and said data rising detection circuit.

9. A retiming circuit according to claim 1, wherein said second phase difference detection means comprises:

a second clock rising detection circuit for detecting the rising edge of said reference clock;

a data falling detection circuit for detecting the falling edge of said input data; and a second voltage producing circuit for outputting a second voltage substantially proportional to the period from the rising edge of said reference clock to the falling edge of said input data by receiving as its input the outputs of said second clock rising detection circuit and said data falling detection circuit.

10. A retiming circuit according to claim 1, wherein:

a mean value calculating means is added to the output of said intermediate phase setting means and the value obtained by dividing the output of the intermediate phase setting means by N, which output is obtained by detecting the phase differences at said first phase difference detection means N number of times and detecting the phase differences at said second phase difference detection means N number of times for N number of reference clocks, which value is supplied from the mean value calculating means to said delay means.

11. A retiming circuit according to claim 1, further provided with:

at least one intermediate phase generating unit having identical configuration to that of the intermediate phase generating unit configured by said first phase difference detection means, said second phase difference detection means, and said intermediate phase setting means and a judging/correcting unit for judging the optimum intermediate phase among the received outputs from said plurality of intermediate phase generating units and correcting said delay.

12. A retiming circuit according to claim 1, wherein said clock is an external clock given from the outside or an internal clock generated inside the retiming circuit.

13. A retiming circuit according to claim 12, further having a clock extracting unit for generating said internal clock by a clock component extracted from said input data.

14. A retiming circuit according to claim 12, wherein said internal clock is generated by a self-excited oscillating circuit.

15. A retiming circuit according to claim 12, further having a selecting unit having both of an input unit of said external clock and a generating unit of said internal clock, selecting one of the outputs of the input unit of the external clock and the generating unit of the internal clock, and defining the selected one as said clock.

16. A method for performing retiming for sampling input data by a clock and discriminating a logic "1" and "0", comprising:

> a first step for detecting a first phase difference between a rising edge of a reference clock generated in synchronization with said clock and a rising edge of said input data;
>
> a second step for detecting a second phase difference between the rising edge of said reference clock and a falling edge of said input data;
>
> a third step for determining an intermediate phase between said first phase difference and said second phase difference;
>
> a fourth step for storing intermediate phase information regarding said intermediate phase; and
>
> a fifth step for applying a delay to said input data or said clock according to said intermediate phase.

* * * * *